3,179,695
PRODUCTION OF METHYL DICHLORO-
PHOSPHINE OXIDE
Earl A. Weilmuenster, Kenmore, and Joseph James Minnick, Niagara Falls, N.Y., assignors to Olin Mathieson Chemical Corporation, a corporation of Virginia
No Drawing. Filed Mar. 6, 1953, Ser. No. 340,911
11 Claims. (Cl. 260—543)

This invention relates to a process for the manufacture of methyl dichlorophosphine oxide, $CH_3POCl_2$, referred to herein as "dichloride."

Methanol and phosphorus trichloride react at temperatures of about 0 to 20° C. to form dimethyl hydrogen phosphite according to the following equation:

$$3CH_3OH + PCl_3 \rightarrow (CH_3O)_2\overset{O}{\overset{\|}{P}}-H + CH_3Cl + 2HCl$$

Pyrolysis of dimethyl hydrogen phosphite at temperatures of about 250° C. and higher, particularly in an atmosphere of nitrogen, yields a complex mixture known as "pyro mix" usually containing approximately the following proportion of principal components:

| Name | Formula | Approx. Percent |
|---|---|---|
| Methyl methane phosphinate | 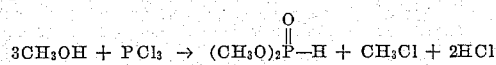 | 20-30 |
| Di(methyl phosphonic acid) | $CH_3-\overset{O}{\overset{\|}{P}}-O-\overset{O}{\overset{\|}{P}}-CH_3$ <br> $\phantom{CH_3-}\underset{OH}{\|}\phantom{-O-}\underset{OH}{\|}$ | 50-60 |
| Pyrophosphoric acid | $HO-\overset{O}{\overset{\|}{P}}-O-\overset{O}{\overset{\|}{P}}-OH$ <br> $\phantom{HO-}\underset{OH}{\|}\phantom{-O-}\underset{OH}{\|}$ | 15-20 |
| | | 100 |

"Dichloride" may be formed from the pyro mix by the action of chlorine and phosphorus trichloride or thionylchloride. Phosgene (carbonyl chloride) however is cheaply available in large quantities and would appear to be a particularly desirable reagent for the conversion of pyro mix to dichloride. It is more volatile than phosphorus trichloride and the phosphoryl chloride formed by that reagent. Carbon dioxide formed as a by-product in using phosgene is much less corrosive than the sulfur dioxide by-product of thionyl chloride.

In spite of the apparent advantages of using carbonyl chloride as reagent, the simple and direct batch treatment of the pyro-mix at atmospheric pressure with phosgene results in the production of little or none of the desired product. In contrast to the use of thionyl chloride, a polymeric mixture is obtained when phosgene is bubbled through pyro mix. Furthermore no appreciable product formation occurs in the presence of most organic liquids. Those which react with acids and acid chlorides including the components of pyro mix, phosgene and the products of the reaction are unsuitable. With aliphatic and aromatic hydrocarbons, chloroform, carbon tetrachloride and pentachloroethane, for example, substantially none of the desired product is formed in the reaction between pyro mix and phosgene in several hours at atmospheric pressure.

We have found, however, that when the pyro mix and phosgene are reacted together at a temperature of about 100° C. or above in a liquid phase reaction system, that is under conditions of contact assuring intimate admixture of phosgene with liquid phase pyro mix, conversion to the desired product is obtained in a substantial amount in a period of several minutes to several hours. The contact time may be varied according to the extent of conversion desired and will depend inversely on the temperature and the pressure. Thus, we have found that substantial conversion of pyro mix to "dichloride" is obtained by chlorination with phosgene at about 100° to 200° C. and by dispersing the pyro mix in a stable inert organic solvent in which phosgene is soluble and contacting the resulting dispersion with phosgene gas for a period of approximately three to six hours. We also have found that the reaction may be conducted by contacting the pyro mix with liquid phosgene while maintaining the reaction mixture under a superatmospheric pressure, e.g. 500 to 2,000 pounds, at a temperature of about 100° to 200° C. After an induction period of several minutes, the reaction goes to substantial completion in ten to fifteen minutes.

In another method of conducting the reaction, the pyro mix as a liquid stream, in the form of a melt or in a solvent, may be flowed through an elongated reaction zone such as a tower or a tubular reactor. The phosgene then is introduced as a gas to the flowing stream at a point providing sufficient reaction time under the prevailing conditions of temperature and pressure. The manner of contact may be countercurrent or concurrent flow.

Thus the process of the invention provides means for utilizing the readily accessible pyro mix and phosgene for the preparation of "dichloride" in excellent yields by a method amenable to large scale operation.

Hence, in the latter instance, the process of our invention provides a continuous cyclic method of converting the components of pyro mix to "dichloride" using phosgene as reagent. In addition to the advantages of cyclic, continuous operation in general as compared to a batch operation, the process provides means for effecting the conversion without the necessity of using any added solvent or dispersion medium and operates substantially at atmospheric pressure. In the process, pyro mix is continuously introduced to a tower in which a liquid body of reacting pyro mix is maintained. Phosgene gas is introduced as reagent. A temperature of about 100° to 200° C. is maintained in the tower, and excess phosgene and gaseous by-products pass overhead to be partially condensed. Flow in the tower may be concurrent or countercurrent but advantageously the pyro mix is introduced at the top of the tower and phosgene at the bottom since countercurrent flow provides desirable agitation and promotes contact of the reactants. Concurrent flow is suitable when the reactor is arranged as a pipe still. Advantageously the pyro mix is preheated to reaction temperatures. Phosgene may be introduced through a diffuser at the bottom of the tower, or liquid phosgene may be introduced. A cooling section, which assists in controlling foam is advantageously arranged at the top of the reactor if a tower type reactor is employed.

Overhead products may pass to a partial condenser where excess phosgene in the gas stream is liquefied and by-product carbon dioxide and other gaseous products are vented. Liquid phosgene is recycled with fresh reagent to the bottom of the reactor. The effluent from the bottom of the reactor passes to a stripper and/or fractionating system from which the dichloride product is removed by distillation and separated from by-product phosphoryl chloride and the bottoms are partially discharged and partially recycled with the pyro mix stream from the preheater to the top of the reactor. Alternatively, a plurality of reactors in series may be used, circulating the liquid reaction product from one tower to the top of the next. Fresh phosgene is advantageously charged to each reactor and the gaseous effluent from each is preferably partially condensed and separated before recycling.

At temperatures above about 140° C. considerable proportions of the product vaporize in the stream of exit gas and the recovery system is suitably arranged to strip product from the gas stream. Alternatively the gas stream may be cooled to condense excess phosgene therefrom, distilling the latter from the product before recycling phosgene to the reactor. In this operation, especially at temperatures above 160° C. little or no product remains in the effluent from the reactor and it may be discharged directly.

Temperature control in the process is important. Temperatures below about 50° C. are inadequate in that the reaction rate is too slow while temperatures above 200° C. are unnecessary and undesirable since they reduce yields by forming undesired by-products. A pressure of from 500 to 2000 pounds or more per square inch under these temperature conditions is advantageous in reducing reaction time. For example, when an excess of liquid phosgene is sealed in a pressure vessel at ordinary temperature and raised to about 125° to 150° C., a pressure of about 700 p.s.i.g. results. Under these conditions, reaction is complete in 10 to 15 minutes in addition to an induction period. At 175° C. under a pressure of about 1300 p.s.i.g., the induction period is reduced to about 6 minutes and yields of over 90% may be obtained in about 10 minutes reaction time. No loss of product appears to occur on additional heating for up to about 30 minutes. Under milder conditions, for example, about 500 p.s.i.g. and 100° C., four hours or more may be necessary to obtain such yields. The preferred reaction conditions for shortest reaction times and maximum yields are a temperature of about 125° to 175° C. and a pressure of about 700–1300 p.s.i.g. Agitation of the pyro mix under phosgene pressure has been found important in order to obtain the best yields and provision of means for agitation is desirable.

In the reaction with phosgene and pyro mix, the components appear to react in the proportions and to form the products shown by the following equations:

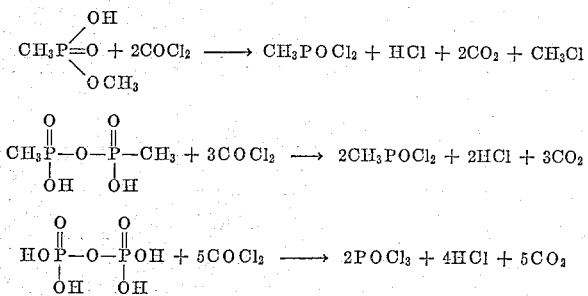

A mixture containing these three reactants in the proportions of 20, 60, 20 parts by weight, respectively, require 1.93 parts by weight of phosgene to one part of the mixture calculated according to the equations above. While the theoretical proportion of phosgene to pyro mix by weight is about 1.93:1 based on the usual composition of the mixture, an excess of phosgene is advantageously employed. Yields of well over 80% are obtained with from 1.15 to 1.45 times the theoretical proportion of phosgene. 1.45 times the theoretical proportion of phosgene means that (1.93) (1.45) or 2.80 parts by weight of phosgene per part by weight of pyro mix is employed. The proportion is not extremely critical but lower yields are generally obtained when less than about 1.15 times the theoretical amount of phosgene is used.

We also have found that the reaction can be effected by dispersing the pyro mix in a stable inert solvent having solubility for phosgene and contacting the solution with phosgene. For example, the reaction may be accomplished at atmospheric pressure by agitating the pyro mix and dispersing it in certain fluids of the silicone type. Examples of suitable materials are the Silicone DC200 Fluids of suitable viscosity. These are described by the manufacturer as polydimethylsiloxanes. Of these, those having a viscosity of from about 1 to 50 centistokes at 25° C. are suitable. Viscosities of about 5 to 20 centistokes at 25° C. are preferred. These silicones are liquids having atmospheric boiling points above about 150° C. and specific gravities at 25° C./25° C. of about 0.8 to about 0.95. They appear to be stable thermally and chemically to the reactants, products and by-products of the present reaction. As described in our copending application Serial No. 340,912, filed March 6, 1953, now abandoned, the solvent with special advantage is a chlorinated organic solvent such as a chloroethane or a chlorinated biphenyl.

According to this method of conducting the invention, chloroethanes containing 2 to 4 atoms of chlorine per molecule are suitable media for the reaction phosgene and pyro mix. Pyro mix does not appear to be very soluble in the chloroethanes but a thorough dispersion of fine droplets is easily formed in these chloroethanes. Under these conditions, gaseous phosgene reacts readily with the components of the mix. The most advantageous of this group of solvents is beta-trichloroethane, a readily available material having a boiling point of 113.5° C. and a density of about 1.44. Its boiling point is sufficiently high that the reaction may be carried out at elevated temperatures, advantageously about 100° C. and its density is sufficient to suspend the pyro mix well. Tetrachloroethane (acetylene tetrachloride) is also suitable in having a boiling point of about 146° C. and a density of about 1.60. When tetrachloroethane is used better fractionation is required than with trichloroethane in order to separate the solvent from the product which has a boiling point of about 160–165° C. Ethylene dichloride may be used but its boiling point of about 70° C. lowers the reaction temperature and longer times of reaction may be required.

The proportion of solvent to be used is not extremely critical but somewhat higher yields are obtained when the proportion by weight of solvent to pyro mix is from about 0.5:1 to about 1.5:1. Yields appear to decrease slightly when the proportion of a solvent is below about 0.5 or above about 1.5 to 1. Chlorinated biphenyls are commercially available under the trade name "Aroclor" and are mixtures containing various chlorine contents. Note Kirk-Othmer, Encyclopedia of Chemical Technology, volume 3, pages 826–832 (1949). For the purposes of present invention, "Aroclors" having a specific gravity of about 1.17 to 1.55 at 25° C./25° C. such as "Aroclor 1248 (a proprietary chlorinated biphenyl, being a yellow-tinted mobile oil having a specific gravity at 25° C. referred to water at 25° C. of 1.447–1.457, an A.S.T.M. distillation range of 340–375° C., a Cleveland open cup flash point of 193–196° C., an A.S.T.M. pour point of −7° C., a $n_D^{20}$ of 1.630–1.631, a Saybolt Universal viscosity of 185–240 seconds at 37.8° C. and a Saybolt Universal viscosity at 98.9° C. of 36–37 seconds) and "Aroclor 1254 (a proprietary chlorinated biphenyl, being a light yellow viscous oil having a specific gravity at 25° C. referred to water at 25° C. of 1.538–1.548, an A.S.T.M. distillation range of 365–390° C., an A.S.T.M. pour point of 10° C., a $n_D^{20}$ of 1.639–1.641, a Saybolt Universal viscosity of 1800–2500 seconds at 37.8° C. and a Saybolt Universal viscosity at 98.9° C. of 44–48 seconds) are suitable. These are very high boiling materials and have the advantage that the by-products of the reaction including phosphoryl chloride may be distilled from the reaction mixture maintained at about 130–150° C. during the introduction of phosgene. The "dichloride" product is readily obtained by vacuum distillation of the residual reaction mixture in excellent yields. Alternatively, at temperatures of 150 to 200° C., the "dichloride" product may be distilled from the reaction mixture as formed and fractionally condensed. It may also be condensed with by-product phosphoryl chloride and subsequently separated therefrom by fractional distillation. Temperatures above about 200° C. are less advantageous due to the formation of increased proportions of undesired by-products.

In another method for conducting the invention, pyro mix and a suitable chloroethane, preferably preheated to reaction temperatures, may be continuously introduced to the top of an unpacked tower in which a liquid body of reacting pyro mix and chloroethane is maintained. Phosgene is introduced countercurrent to the downward flow of pyro mix. Gaseous by-products and excess reagent are separated, recycling the latter. The dichloride product is recovered from the tower effluent. Phosgene is advantageously introduced as a gas since this maintains the pyro mix in dispersion in the chloroethane medium. However, alternative means of introduction of phosgene may be used including, for example, introduction of chloroethane saturated with phosgene or introduction of liquid phosgene.

Alternatively also the reactants may be introduced and flowed concurrently through a tubular reactor. The latter is not necessarily vertical but may be arranged, for example, as a pipe still. The use of packing is generally disadvantageous as it tends to separate the dispersion and prevent adequate contact of the reactants. For this reason an unpacked reactor is preferred. The suitable reactor comprises an electrically heated, jacketed column ¾ inch in diameter and 5 feet long. A coarse sintered glass inlet tube may be arranged near the bottom as an inlet for phosgene. About 2 feet down from the top an inlet for pyro mix-chloroethane is provided. The upper 2 feet of the column is jacketed and cooled to return entrained chloroethane to the reactor and to control foaming. Overhead gases are conducted through a partial condenser to strip chloroethane and product from by-product gases. The latter are vented.

*Example I*

A mixture of 20 parts by weight of pyro mix and 58 parts by weight of liquid phosgene was sealed in a pressure vessel and heated with agitation during a period of one hour to 125° C. at which temperature the mixture was maintained for fifteen minutes. The pressure developed was 720 p.s.i.g. At the end of the reaction period the bomb was cooled, vented, opened, and the contents removed. The reaction mixture was degassed by blowing with dry nitrogen. It was then reduced at atmospheric pressure to a vapor temperature of 157° C. and the residue was vacuum fractionated at 22 mm., collecting the fraction boiling at 64° C. as product. This amounted to 19.8 parts of "dichloride" by weight amounting to a yield of 82.5% based on the available phosphorus in the pyro mix.

*Example II*

Using a procedure similar to that of the preceding example but in somewhat larger equipment, a mixture of 300 parts by weight of pyro mix and 872 parts by weight of liquid phosgene was sealed in a pressure vessel, rocked and heated to 150° C. during a period of one hour and maintained at that temperature for 15 minutes. The maximum pressure developed was 1370 p.s.i.g. On working up the reaction mixture as described in Example I, a yield of 303.8 parts by weight of "dichloride" was obtained corresponding to 84.3% based on the available phosphorus.

*Example III*

A mixture of 23.5 parts by weight of pyro mix and 62 parts by weight of liquid phosgene was prepared in a pressure vessel cooled by Dry Ice and acetone. The bomb was sealed and brought to room temperature quickly by immersion in warm water. It was then transferred to a jacket pre-heated to 350° C. The pressure vessel was agitated during the reaction period. About ten minutes was required to heat the contents to 175° C. and this temperature was maintained for fifteen minutes. At the end of this time the contents were removed and worked up as described in the preceding examples, obtaining a yield of 27.1 parts of "dichloride" corresponding to a yield based on the available phosphorus of 95.7%.

*Example IV*

A mixture of 100 parts by weight of pyro mix and 100 parts by weight of "Dow-Corning" Silicone Fluid 200 was stirred and heated at 140° C. for a period of five hours during which time 625 parts by weight of phosgene was introduced through a gas diffusion tube. At the end of this time the reaction mixture was degassed by blowing with nitrogen and fractionated at atmospheric pressure to a vapor temperature of 157° C. The residue was vacuum distilled and the fraction boiling at about 60° C. at 20 mm. was separated as product. A yield of 112.5 parts by weight of "dichloride" corresponding to 93.5% based on the available phosphorus, was obtained.

*Example V*

To 100 grams of pyro mix in a 400 ml. reaction flask equipped with a condenser, thermometer well, mechanical stirrer and an 8 mm. gas dispersion tube was added 100 grams of beta-trichloroethane. The mixture was maintained at a temperature of 100° C. while phosgene was introduced through the gas dispersion tube at the rate of 2 grams per minute for 3.5 hours. The reaction mixture was cooled to room temperature with stirring and then fractionated at atmospheric pressure to a vapor temperaaure of 157° C., removing a mixture of phosphorus oxychloride and trichloroethane. The residue was vacuum distilled and 103.8 grams of "dichloride" to boiling at 56° C. at 14 mm. was separated as product. The yield was 86.5% based on the available phosphorus in the pyro mix and is considered available to produce the desired product as shown by the equations above.

*Example VI*

A mixture of 100 parts of pyro mix and 109.6 parts of Aroclor 1254 was heated and stirred for 1 hour at 125° C. and for 3 hours at 135° C. During 4 hours, 480 parts by weight of phosgene was introduced through a gas diffuser tube. By-products were continuously distilled out. A total of 86.6 parts by weight of "dichloride" was recovered by distillation, the product boiling at about 60° C. at 20 mm. pressure. This corresponds to a yield of 72.7% based on the available phosphorus in the pyro mix.

We claim:
1. A process for the production of methyl dichlorophosphine oxide by chlorination of pyro mix, comprising a mixture of methyl methane phosphinate, di(methyl phosphonic acid) and pyrophosphoric acid, which process comprises contacting the pyro mix with phosgene at about 100° to 200° C. in a liquid phase reaction system providing intimate contact between the reactants for a period of time sufficient to effect substantial conversion of the pyro mix to methyl dichlorophosphine oxide.
2. The process of claim 1 in which intimate contact is obtained by dispersing the pyro mix in a solvent for phosgene.
3. The process of claim 1 in which the reaction is conducted under superatmospheric pressure.
4. The process of claim 1 in which intimate contact of the reactants is obtained by flowing the pyro mix as a liquid stream through an elongated reaction zone and introducing the phosgene into the flowing stream at a point providing sufficient contact time to effect substantial conversion of the pyro mix to methyl dichlorophosphine oxide.
5. A process for the production of methyl dichlorophosphine oxide by chlorination of pyro mix, comprising a mixture of methyl methane phosphinate, di-(methyl phosphonic acid) and pyrophosphoric acid, which process comprises reacting the pyro mix with from about 1.93 to 2.80 parts by weight of phosgene per part by weight of pyro mix at 100° to 200° C. and at a pressure of from 500 to 2000 pounds per square inch in a liquid phase reaction system providing intimate contact between the reactants for a period of time sufficient to effect substantial conversion of the pyro mix to methyl dichlorophosphine oxide.

6. A process for the production of methyl dichlorophosphine oxide by chlorination of pyro mix, comprising a mixture of methyl methane phosphinate, di-(methyl phosphonic acid) and pyrophosphoric acid, which comprises dispersing the pyro mix in a solvent for phosgene selected from the group consisting of polydimethylsiloxanes having a viscosity of from about 1 to 50 centistokes at 25° C., chloroethanes and chlorinated diphenyls and contacting the dispersion in liquid phase with phosgene at a temperature of 100° to 200° C. for a period of time effecting substantial conversion of the pyro mix to methyl dichlorophosphine oxide.

7. The process of claim 6 in which the solvent is a chloroethane containing 2 to 4 atoms of chlorine per molecule.

8. The process of claim 7 in which the solvent is beta-trichloroethane.

9. The process of claim 7 in which the solvent is tetrachloroethane.

10. The process of claim 7 in which the solvent is ethylene dichloride.

11. The process of claim 6 in which the solvent is a chlorinated biphenyl having a specific gravity of about 1.17 to 1.55 at 25° C.

References Cited by the Examiner
UNITED STATES PATENTS

| | | | |
|---|---|---|---|
| 2,929,843 | 3/60 | Dawson et al. | 260—543 |
| 2,994,715 | 8/61 | Bloch | 260—543 |
| 3,008,987 | 11/61 | Fahnoe et al. | 260—543 |
| 3,074,994 | 1/63 | Grayson | 260—464 |

OTHER REFERENCES

Houben-Weyl: Methoden der Organischen Chemie, vol. 12, 1963, p. 390.

LORRAINE A. WEINBERGER, *Acting Primary Examiner*

WILLIAM G. WILES, REUBEN EPSTEIN, LEON D. ROSDOL, *Examiners*.